United States Patent [19]

Alvarez

[11] Patent Number: 4,688,308
[45] Date of Patent: Aug. 25, 1987

[54] MOBILE RADIATOR SHOP

[76] Inventor: Ramon A. Alvarez, 104 E. 228th St., Carson, Calif. 90745

[21] Appl. No.: 769,541

[22] Filed: Aug. 26, 1985

[51] Int. Cl.$^4$ .............................................. B60R 11/00
[52] U.S. Cl. ................................... 29/33 R; 29/33 G; 29/157.3 B; 29/402.18; 296/24 R
[58] Field of Search .................... 29/33 R, 33 G, 564, 29/157.3 R, 157.3 B, 402.07, 402.13, 402.16, 402.18; 296/24 R

[56] References Cited

U.S. PATENT DOCUMENTS

| | | | |
|---|---|---|---|
| 2,358,446 | 9/1944 | Couse | 296/24 R |
| 2,365,940 | 12/1944 | Couse | 296/24 R |
| 3,697,123 | 10/1972 | Gygrynuk | 296/24 R |
| 3,810,487 | 5/1974 | Cable et al. | 296/24 R X |
| 4,230,358 | 10/1980 | Legueu | 296/24 R |
| 4,614,226 | 9/1986 | Ryan | 29/402.18 X |

FOREIGN PATENT DOCUMENTS 893388  1/1944  France .............................. 296/24 R

*Primary Examiner*—Z. R. Bilinsky

*Attorney, Agent, or Firm*—Charles H. Thomas

[57] ABSTRACT

A portable automotive vehicle radiator repair shop is mounted on an automotive vehicle. The vehicle is equipped with an immersion tank having an open top and a drain beneath and a power lift having a platform moveable to submerge and raise a radiator to be repaired which is positioned thereon. The vehicle has a water distribution system with a female garden hose coupling as a water inlet. The vehicle is also equipped with a pneumatic reservoir having a pneumatic inlet coupling adapted to receive an air hose of the type with which most service stations and garages are equipped. The vehicle is also equipped with a blowtorch, a propane tank and an oxygen tank. The propane and oxygen tanks are connected to the blowtorch. The propane and air supply from the pneumatic tank are connected to a drying torch and the water distribution system and pneumatic air supply are connected to a flushing nozzle. A paint reservoir and paint sprayer are also employed and the paint sprayer is connected to the pneumatic tank as well.

12 Claims, 4 Drawing Figures

MOBILE RADIATOR SHOP

BACKGROUND OF THE INVENTION

1. Field of the Invention

The present invention relates to systems for repairing automotive vehicle radiators.

2. Description of the Prior Art

At present, when an automotive vehicle develops a radiator leak, or when the vehicle radiator otherwise becomes damaged, the vehicle cannot be driven. Serious engine damage is likely to occur if a vehicle is driven with a defective radiator. When an automotive vehicle radiator becomes defective on the road, a motorist with a leaking or damaged radiator is usually forced to call a vehicle towing service. Road towing services assess charges for towing according to the distance that the disabled vehicle is towed. Road towing services are rather expensive, so it is to the advantage of the motorist for the vehicle to be towed as short a distance as possible. Typically the towing service will tow the disabled vehicle and drop it at the nearest automotive vehicle service station or garage facility.

Most automotive vehicle service stations, and many garages, do not have the capability of repairing automotive vehicle radiators. Since the equipment necessary to repair radiators is highly specialized for that purpose, the capital investment involved simply cannot be justified by many service station and garage owners. Furthermore, specialized skill is required in order to effectuate radiator repairs. Most personnel of roadside and highway service stations simply are not trained to perform the necessary tasks in repairing radiators as the expense of such training cannot be justified by the number of instances that radiator repair expertise is utilized at general automotive repair facilities.

To effectuate vehicle radiator repairs, the skilled use of a blowtorch is usually necessary to melt solder in order to patch holes in the radiator. Also, specialized knowledge and skill is required in order to properly flush blockages from the radiator and to locate all of the leaks in a radiator and properly repair them. Accordingly, it is the usual and customary practice for most service stations to remove a leaking or damaged radiator and take it to a specialized radiator repair shop. The radiator is repaired at the shop and then must be picked up by service station personnel. If the radiator is dropped off and later picked up, two round trips to the radiator repair shop are necessary by some member of the service station staff. In this event the vehicle is disabled for an inordinately long time due to the necessity for delivering and subsequently picking up the radiator. Alternatively, if a member of the service station staff waits at the radiator repair shop for the radiator to be repaired, there is frequently a considerable period of unproductive waiting time. In either event, radiator repairs performed according to conventional practice are both excessively time consuming and inordinately expensive.

SUMMARY OF THE INVENTION

According to the present invention a portable automotive vehicle radiator repair shop is mounted on an automotive vehicle. The portable repair shop is equipped with an immersion tank having an open top and a drain beneath. A power lift is provided having a platform that is moveable between an elevated position above the immersion tank and a lowered position submerged in the immersion tank. A water distribution system is also provided and has a water inlet with a garden hose coupling and a spigot for filling the immersion tank connected to the water inlet. A pneumatic reservoir is also provided and has a pneumatic inlet coupling adapted to receive a a conventional service station air hose in releasable engagement therewith. The vehicle is also provided with a blowtorch connected to a blowtorch fuel supply reservoir and an oxygen reservoir. A drying torch is connected to the blowtorch fuel supply reservoir and to the pneumatic reservoir. A flushing nozzle is connected to the water distribution system and to the pneumatic reservoir.

A self contained mobile automotive vehicle radiator repair shop according to the invention provides a system for repairing leaky and damaged radiators far more quickly and with a very considerable reduction in idle time for the personnel involved as contrasted with conventional radiator repair practices. When a disabled vehicle with a defective radiator is towed into a roadside service repair facility, a radiator shop specializing in radiator repair can be called. Ideally, the mobile repair shop of the invention is accessible by radio or portable telephone. The mobile automotive vehicle radiator repair shop of the invention can then be driven to the service station facility to effectuate on the spot repair of the radiator involved.

The requirements for water and compressed air are provided by the automotive vehicle servicing facility to which the disabled vehicle has been towed. Such service facilities, while usually without the equipment and expertise necessary to effectuate radiator repairs, invariably have an outdoor hose bib which terminates in conventional male garden hose threads. The service station may or may not have a hose connected to the bib. Such service faciities also invariably have an air compressor and an air hose with a quick release, female coupling adapted to receive a corresponding quick release bayonet type fitting. The self contained, mobile radiator shop has a female garden hose coupling as an inlet into the water distribution system aboard the vehicle. Also, the pneumatic reservoir of the mobile radiator shop is equipped with a bayonet type fitting adapted to receive the end of a conventional service station air hose. Thus, within moments of its arrival at a general automotive servicing facility, the mobile repair shop of the invention is provided with both water and air under pressure.

Since most general purpose automotive repair and servicing facilities do not have the necessary fuel and oxygen for operating a blowtorch, a tank of blowtorch fuel, such as propane, and oxygen are stored and maintained in the mobile radiator repair shop. These tanks are coupled through suitable hoses to a blowtorch nozzle.

A defective radiator is usually removed from the disabled vehicle by the service station personnel prior to the arrival of the mobile radiator repair shop of the invention. Upon arrival of the mobile repair shop, a garden water hose and a pneumatic air hose from the service station are releasably plugged into the corresponding connections in the mobile repair shop. The radiator is flushed out with the flushing nozzle to remove scale and debris whih might otherwise clog water circulation through the radiator. Leaks in the radiator are then located using the immersion tank on the vehicle. The lift, preferably powered by the pneumatic reservoir, is used to raise and lower the radiator positioned on a platform or tray during the leak location process. Once the leaks have been located, the interior and exterior of the radiator are dried with the drying torch. The blowtorch is then used to melt solder to effectute necessary patches to the radiator.

Once all of the leaks have been patched, the exterior of the radiator is painted with the mobile repair shop paint sprayer as an indication that the necessary repairs have been completed. Once the paint has dried the radiator can be returned to the vehicle from which it was removed.

Upon completion of the radiator repair, the water and pneumatic couplings are merely disconnected and the mobile radiator repair shop of the invention is available to respond to the next subsequent call. By employing the portable or mobile radiator repair shop of the invention, radiators may be repaired far more quickly and economically as contrasted with current practice.

The invention may be described with greater clarity and particularity by reference to the accompanying drawings.

DESCRIPTION OF THE DRAWINGS

FIG. 3 is a top plan sectional view of the rear portion of the mobile radiator repair shop of FIG. 1.

FIG. 4 is a diagramatic view showing the interconnection of the fluid systems employed in the mobile radiator repair shop of FIG. 1.

DESCRIPTION OF THE EMBODIMENT

Figure 1:
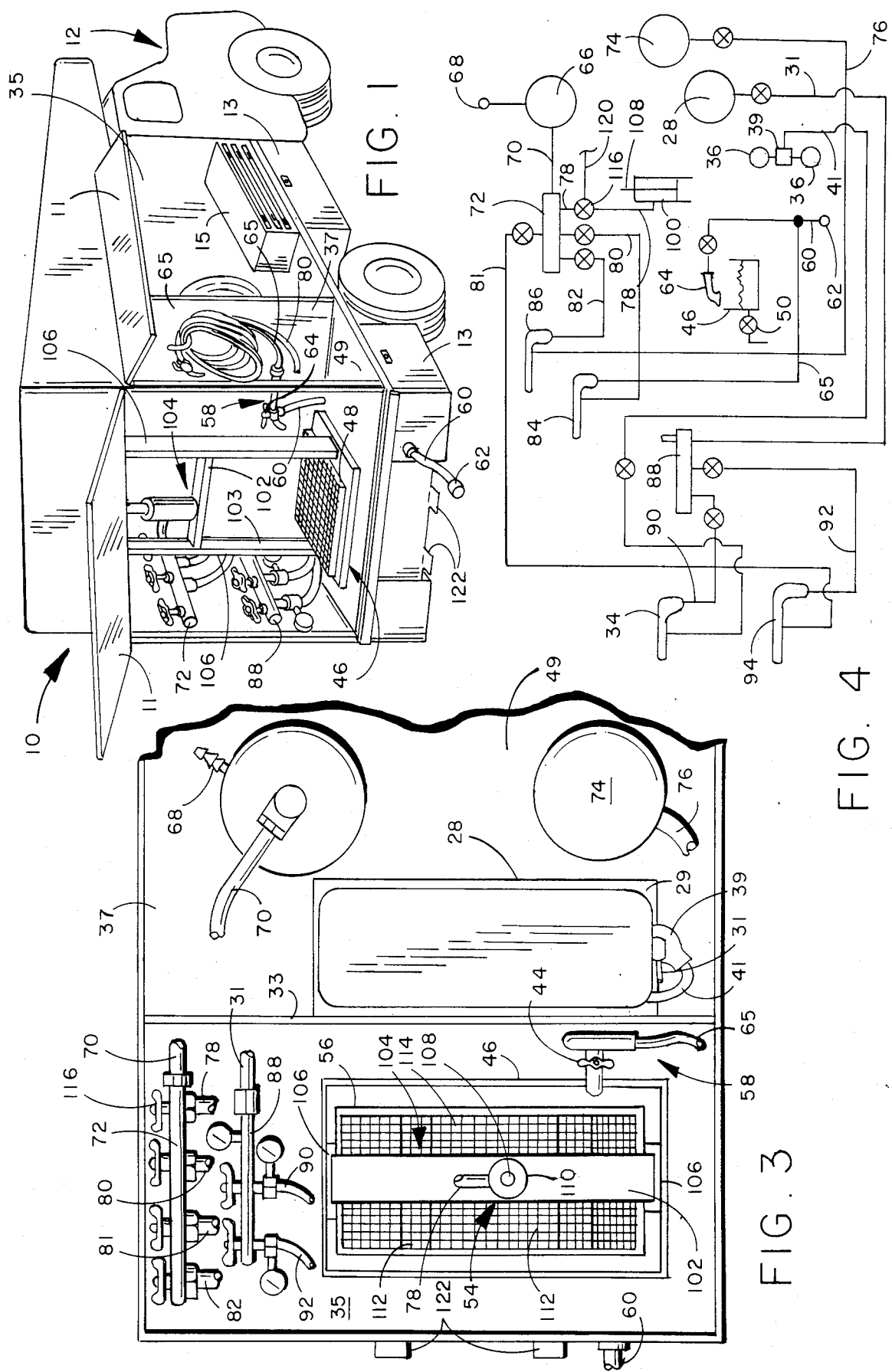
FIG. 1 is a perspective view from the rear of a self contained, mobile, automotive radiator repair shop according to the invention.

FIG. 1 illustrates a self contained, mobile automotive vehicle radiator repair shop 10. The portable repair shop 10 employs an automotive vehicle 12 which may employ the chassis and cab of a conventional ½ ton or ¾ ton pickup truck. Behind the vehicle cab the working and storage areas of the portable repair shop 10 are enclosed by hinged panels 11. The panels 11 are lifted and hooked open as illustrated in FIG. 1 during repair of a radiator, but are swung down and secured shut while the vehicle 12 is in transit. Tool and equipment storage boxes 13 are located beneath the floor of the rear of the vehicle 12, and overhead storage shelves are located within the rear of the vehicle above the hinged panels 11. A tool box, indicated at 15, may also be carried in the storage area.

Figure 2:
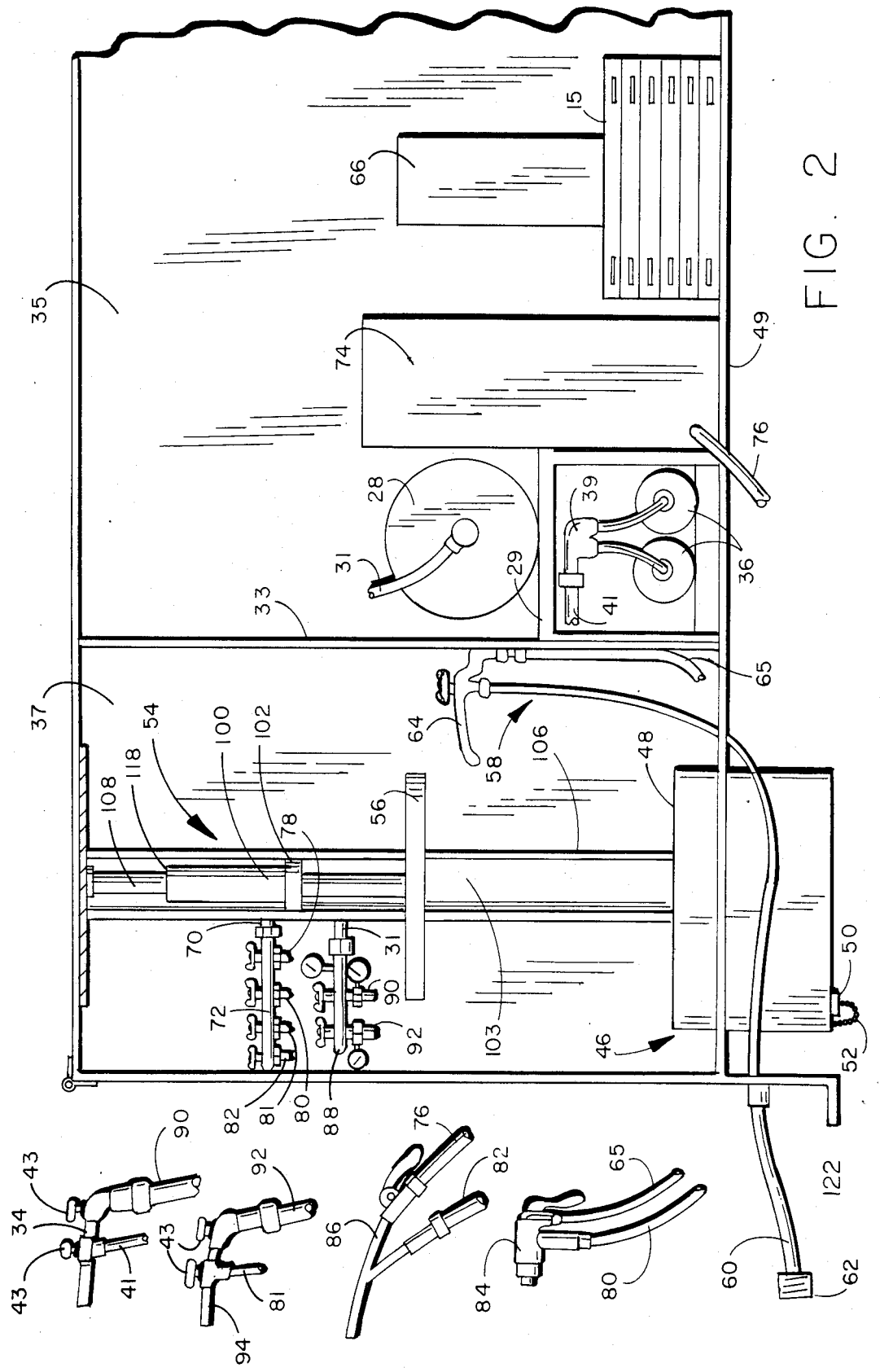
FIG. 2 is a side elevational sectional view of the rear portion of the mobile radiator repair shop of FIG. 1 as viewed from the passenger side.

The portable repair shop 10 is equipped with a blowtorch fuel reservoir in the form of a generally cylindrical propane tank 28. As illustrated in FIGS. 2 and 3, the propane tank 28 is positioned resting on its side on a platform 29 and extends transversely relative to the alignment of the vehicle 12. Beneath the platform 29 there are a pair of oxygen reservoirs in the form of tubular oxygen bottles 36. The oxygen bottles 36 are likewise mounted to extend transversely to the alignment of the vehicle 12.

The propane tank 28 has a flexible, outlet hose 31 which extends through or beneath a vertical partition 33 that separates the forward storage area 35 of the mobile radiator repair shop 10 from the rearward work area 37. The oxygen bottles 36 are coupled together by tubes to a junction 39, which in turn is connected to a flexible hose 41 that likewise passes through or beneath the partition 33. To facilitate understanding of the drawings, the intermediate lengths of the various hoses and conduits employed in the invention are not illustrated throughout, except in FIG. 4. In most of the drawing figures only the ends of such flexible conduits and hoses are shown.

A blowtorch 34, illustrated in FIG. 2 and diagramatically depicted in FIG. 4, is connected to the propane tank 28 and the oxygen bottles 36 by means of the hoses 31 and 41, respectively. Because the oxygen supply is provided only to the blowtorch 34, the hose 41 is connected directly to the blowtorch 34. The propane from the propane tank 28 is utilized for other purposes as well as for supplying fuel to the blowtorch 34, however. Therefore, the hose 31 is connected to a propane manifold 88, mounted in the work area 37 of the portable radiator shop 10, as best depicted in FIGS. 2 and 3. From the propane manifold 88 a hose 90 extends to the blowtorch 34. The input to the propane manifold 88 has a pressure gage associated therewith, and all of the outlet hoses from the propane manifold 88 have adjustable metering valves and gages so that the user is informed of propane pressure at the inlet and to all of the outlets of the propane manifold 88 at all times. Pressure to the outlet hoses 90 and 92 from the propane manifold 88 may be adjusted to achieve the appropriate gage pressure by means of the metering valve knobs depicted in FIGS. 2 and 3. As with conventional blowtorches, the relative mixture of oxygen and propane can be adjusted by means of metering valves on the blowtorch 34. These valves are operated by rotatable valve knobs 43. The blowtorch 34 is normally hung out of the way on a hook in the working area 37 of the portable repair shop 10.

A rectangular immersion tank 46 twelve inches deep is provided in the work area 37 and extends below the level of the floor 49 of the rear of the vehicle 12. The immersion tank 46 has an open top 48 and a floor with a drain and a releasable plug 50 therein. The releasable plug 50 is tethered by a chain 52 and may be inserted into the drain, as depicted in FIG. 2, when the immersion tank 46 is to be filled.

A power lift 54 having a horizontally disposed rectangular platform or tray 56 is located in the work area 37. The platform 56 is moveable between an elevated position above the immersion tank 46, as depicted in FIG. 2, and a lowered position in which the platform 56 is moved vertically downwardly to the bottom of the immersion tank 46. When in the lowered position, the platform 56 is entirely submerged. The platform 56 is used to raise and lower a radiator to be repaired to test the radiator for leaks, as will hereinafter be described.

The mobile radiator repair shop 10 also has a water distribution system indicated generally at 58 in FIG. 2. The water distribution system 58 has a water inlet including a length of hose 60 with a female garden hose coupling 62 located at the right rear extremity of the vehicle 12. A spigot 64, which may be a conventional garden hose bib, is mounted on the rear side of the partition 33 and is positioned for filling the immersion tank 46. The spigot 64 is connected to the water inlet hose 60. The water distribution system 58 also includes a flexible hose 65 which is connected to a flushing nozzle 84, hereinafter to be described.

A pneumatic reservoir is provided in the form of an upright, cylindrical air tank 66 located in the storage area 35 of the vehicle 12. The pneumatic reservoir 66 has a pneumatic inlet in the form of a quick disconnect bayonet type inlet coupling 68, visible in FIG. 3. The coupling 68 is of the type adapted to receive the female quick disconnect fitting of an air hose of the type found at most automotive service station facilities. Such air hoses are normally used to fill tires with air and to operate vehicle lifts, and are supplied with compressed air from a compressor located within such service stations. Once connected to the service station air hose, the pneumatic reservoir 66 serves to maintain and supply a constant air pressure to the portable radiator repair shop 10. A pneumatic outlet hose 70 extends from the pneumatic reservoir 66 to the work area 37 through or beneath the partition 33. The hose 70 terminates in a pneumatic manifold 72, located in the work area 37 and best depicted in FIGS. 2 and 3. The pneumatic manifold 72 has pneumatic outlet hoses 78, 80, 81 and 82 which extend, respectively, to the lift 54, a flushing nozzle 84, a drying torch 94, and a paint spraying nozzle 86.

An upright, cylindrical paint reservoir 74 is also located within the storage area 35 of the portable radiator repair shop 10. At the bottom of the paint reservoir 74 there is a gravity feed line 76 that extends rearwardly through or beneath the partition 33 to the paint sprayer 86. The paint sprayer 86 is also connected to the pneumatic hose 82.

The lift 54 includes a pneumatic cylinder 100 which is mounted atop the cross arm 102 of a rectangular frame 104 oriented vertically and transversely in the work area 37. The circular end of the cylinder 100 is fastened to and closed by the cross arm 102, and the annular end 118 of the cylinder 100 faces upwardly. The vertical legs 103 of the frame 104 slide vertically within tracks defined in upright channels 106 located on either side of the immersion tank 46. A piston, indicated diagramatically at 108 in FIG. 4, has a narrow piston rod which is mounted to a plate on the roof of the vehicle 12. A broader piston head is located within the confines of the cylinder 100 and defines a cylindrical air space therebelow and an annular air space thereabove bounded by the cross arm 102 and the cylinder face 118, respectively. The lower extremity of the frame 104 is connected to the generally horizontal, rectangular platform or tray 56. The tray 56 is supported from beneath by longitudinally aligned members 112 and is covered with an open screen mesh 114.

The lift 54 is operated by means of a valve 116 on the pneumatic manifold 72. The valve 116 contols air flow into the outlet hose 78 and also air flow to a bleed line 120, indicated in FIG. 4. The tray or platform 56 is moved upwardly to a raised position by rotation of the knob of the valve 116 in one direction. The valve 116 thereupon allows air to pass from the air hose 70 through the pneumatic manifold 72 to the hose 78 and into the annular air space in the cylinder 100 above the head of the piston 108 and beneath the annular end 118 of the cylinder 100. The pressure of the air admitted to the cylinder 100 acts against the upper annular surface of the piston head and against the lower surface of the annular end 118 of the cylinder 100. The cylinder 100 is thereby forced upwardly relative to the piston 108, which is mounted in fixed position on the roof of the vehicle 12. As the cylinder 100 is raised, it carries with it the frame 104, thus elevating the platform or tray 56 to the position depicted in FIG. 2.

When the mobile automotive vehicle radiator repair shop 10 is called to a job site where the radiator of a disabled vehicle has been removed for repair, the radiator is first flushed with the flushing nozzle 84 to clean the radiator core and dislodge any scale or debris which may be clogging the radiator. The flushing nozzle 84 includes a conventional trigger to allow water to be ejected through the hose 65. A metering valve on the pneumatic manifold 72 is used to regulate pneumatic pressure to the air hose 80.

The drain plug 50 is then inserted into the drain of the immersion tank 46, and the spigot 64 is opened to allow the immersion tank 46 to be filled through water supplied by the hose 60. Once the immersion tank 46 has been filled, the radiator to be repaired, which by then has been flushed with spray from the flushing nozzle 84, is placed flat on the platform 56. The radiator cap is tightened and the connections for the radiator hoses are sealed with conventional temporary plugs. The knob of the valve handle 116 is then turned in an opposite direction to allow air to escape through a bleed line 120. The weight of the radiator on the platform 56 forces the entrapped air out from between the upper surface of the piston head and the annular end 118 of the cylinder 100. As air is forced out of the cylinder 110 through the bleed line 120, the frame 104 travels downwardly with the vertical legs 103 traveling within the tracks defined by the upright channels 106. The tray 56 comes to rest fully submerged in the immersion tank 46, and the radiator atop the tray 56 is likewise fully submerged. The existence of leaks in the radiator can thus be detected by bubbles escaping from the radiator in the immersion tank 46.

Once the leaks have been located and marked on the radiator, the knob of the valve 116 is turned again to force the frame 104 upwardly to bring the platform 56 to its raised position depicted in FIG. 2. The radiator is then removed from the platform 56 and supported on rearwardly extending, horizontal ledges 122 defined on the rearmost end of the vehicle 12. The temporary plugs for the radiator hose connections are then removed. The appropriate valves in the pneumatic manifold 72 and the propane manifold 88 are then opened and adjusted and the drying torch 94 is ignited. Air is supplied to the drying torch 94 though the hose 81 and propane is supplied through hose 92. The air-fuel ratio is adjusted on the drying torch 94 by means of rotatable valve knobs 43. The flame from the drying torch 94 is played across the radiator to rapidly boil any remaining water away so as to allow metal patches to be soldered in place.

After the drying torch 94 is extinguished, the valves in the blowtorch 34 are opened by means of the knobs 43 to produce an appropriate flame of propane burning in oxygen. The blowtorch 34 is used to heat metal patches and to melt solder to seal the patches over leaks in the radiator. Once all of the patches have been soldered in place with the blowtorch 34, the blowtorch 34 is extinguished.

With the repair of the radiator completed, the radiator is ready to be painted. A valve in the pneumatic manifold 72 is opened to admit air to the hose 82 leading to the paint nozzle 86. Paint from the gravity feed line 76 is then atomized by the compressed air entering the paint nozzle 86 through the hose 82. The radiator is then painted to signify completion of the repair task.

After repair of a radiator with the portable repair shop 10 of the invention, the vehicle 12 can be driven to the next service call. Use of the mobile, automotive vehicle radiator repair shop eliminates the burdonsome pickup and delivery of radiators to be repaired, and the waste of travel and waiting time by service station personnel. Thus, radiators can be repaired far more efficiently with the mobile radiator repair shop according to the present invention than is currently possibly.

Undoubtedly, numerous variations and modifications of the invention will become readily apparent to those familiar with automotive vehicle radiator repairs. Accordingly, the scope of the invention should not be construed as limited to the specific embodiment depicted and described, but rather is defined in the claims appended hereto.

I claim:

1. A mobile automotive vehicle radiator repair shop comprising a vehicle equipped with an immersion tank having an open top and a drain beneath, a water distribution system including a female garden hose coupling adapted for connection to a hose bib connected to a water distribution manifold with a spigot located above said immersion tank and connected to said water distribution manifold, a lift having a platform moveable between a lowered position submerged in said immersion tank and a raised position above said tank, a pneumatic reservoir having a quick disconnect pneumatic fitting thereto adapted to receive a service station air hose, a blowtorch fuel reservoir, an oxygen reservoir, a blowtorch means connected to said blowtorch fuel reservoir and to said oxygen reservoir, and a drying torch connected to said blowtorch fuel reservoir and to said pneumatic reservoir.

2. A mobile automotive vehicle radiator shop according to claim 1 further comprising a paint reservoir, a paint sprayer coupled to said paint reservoir and to said pneumatic reservoir, and a flushing nozzle connected to said pneumatic reservoir and to said water manifold.

3. A mobile automotive vehicle radiator repair shop according to claim 2 further comprising a gravity feed line between said paint reservoir and said paint sprayer.

4. A mobile automotive vehicle radiator shop according to claim 1 wherein said lift includes a pneumatically powered piston and cylinder coupled to said pneumatic reservoir and said piston and cylinder are connected between said vehicle and said platform.

5. A mobile automotive vehicle radiator repair shop according to claim 1 wherein said blowtorch fuel reservoir is a propane tank.

6. A self contained, mobile automotive vehicle radiator repair shop comprising an automotive vehicle equipped with blowtorch fuel reservoir means and oxygen reservoir means, a blowtorch connected to said blowtorch fuel reservoir means and to said oxygen reservoir means, an immersion tank open at the top and having a drain beneath with a releasable plug therein, an automated lift having a tray adapted to receive an automotive vehicle radiator to be repaired wherein said tray is operated by said lift to move between a lowered position submerged in said immersion tank and a raised position elevated above said immersion tank, a water distribution system including a water inlet having a female garden hose coupling adapted for connection to a hose bib, and a spigot for filling said immersion tank in communication with said water inlet, a pneumatic pressure tank having a pneumatic inlet coupling adapted for connection to a service station air hose, a flushing nozzle adapted for flushing radiators in communication with said water inlet and said pneumatic pressure tank, a drying torch connected to said pneumatic pressure tank and to said blowtorch fuel reservoir means, a paint reservoir, and a paint spray nozzle connected to said paint reservoir and to said pneumatic pressure tank.

7. A self contained mobile automotive vehicle radiator repair shop according to claim 6 in which said lift includes a pneumatic cylinder connected to said pneumatic pressure tank and a piston reciprocally moveable therein, and said piston and said cylinder are interposed between said automotive vehicle and said tray.

8. A self contained mobile automotive vehicle radiator repair shop according to claim 6 in which said blowtorch fuel reservoir means is comprised of a tank of propane.

9. A portable automotive vehicle radiator repair shop mounted on an automotive vehicle comprising:
an immersion tank having an open top and a drain beneath,
a power lift having a platform moveable between an elevated position above said immersion tank and a lowered position submerged in said tank,
a water distribution system having a water inlet with a garden hose coupling adapted for connection to a hose bib and a spigot for filling said immersion tank connected to said water inlet,
a pneumatic reservoir having a pneumatic inlet with an inlet coupling adapted to receive a service station air hose,
a blowtorch fuel supply reservoir,
an oxygen reservoir,
a blowtorch connected to said blowtorch fuel supply reservoir and to said oxygen reservoir,
a flushing nozzle connected to said water distribution system and to said pneumatic reservoir, and
a drying torch connected to said blowtorch fuel supply reservoir and to said pneumatic reservoir.

10. A portable radiator repair shop according to claim 9 further comprising a paint reservoir and a paint sprayer connected to said paint reservoir and to said pneumatic reservoir.

11. A portable radiator repair shop according to claim 9 wherein said blowtorch fuel supply reservoir is comprised of a propane tank.

12. A portable radiator repair shop according to claim 9 wherein said power lift includes a pneumatic cylinder connected to said pneumatic reservoir and a piston reciprocally moveable within said cylinder and said piston and said cylinder are interposed between said platform and said automotive vehicle whereby said piston moves said platform between said elevated and lowered positions.

* * * * *